US012561080B2

(12) United States Patent　　　　　(10) Patent No.:　US 12,561,080 B2
Muchherla et al.　　　　　　　　　　(45) Date of Patent:　　Feb. 24, 2026

(54) RESEQUENCING DATA PROGRAMMED TO MULTIPLE LEVEL MEMORY CELLS AT A MEMORY SUB-SYSTEM

(71) Applicant: MICRON TECHNOLOGY, INC., Boise, ID (US)

(72) Inventors: Kishore Kumar Muchherla, Fremont, CA (US); Ashutosh Malshe, Fremont, CA (US); Peter Feeley, Boise, ID (US); Jonathan S. Parry, Boise, ID (US); Akira Goda, Tokyo (JP); Jeffrey S. McNeil, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 435 days.

(21) Appl. No.: 17/715,799

(22) Filed: Apr. 7, 2022

(65) Prior Publication Data
US 2023/0195350 A1　　Jun. 22, 2023

Related U.S. Application Data

(60) Provisional application No. 63/292,926, filed on Dec. 22, 2021.

(51) Int. Cl.
　*G06F 3/06*　　　(2006.01)
　*G06F 12/02*　　　(2006.01)
(52) U.S. Cl.
　CPC ............ *G06F 3/065* (2013.01); *G06F 3/0604* (2013.01); *G06F 3/0652* (2013.01);
(Continued)

(58) Field of Classification Search
　CPC ...... G06F 3/065; G06F 3/0604; G06F 3/0652; G06F 3/0659; G06F 3/0673; G06F 12/0253; G06F 3/064; G06F 3/061; G06F 3/0679
See application file for complete search history.

(56) References Cited

U.S. PATENT DOCUMENTS

| | | | |
|---|---|---|---|
| 2002/0129200 A1* | 9/2002 | Arakawa ................. | G11B 20/10 |
| 2014/0254270 A1* | 9/2014 | Maejima ................. | G11C 16/08 |
| | | | 365/185.11 |

(Continued)

*Primary Examiner* — Hosain T Alam
*Assistant Examiner* — Alan Otto
(74) *Attorney, Agent, or Firm* — Lowenstein Sandler LLP

(57) ABSTRACT
A first set of host data items are programmed to first memory pages residing at a first region of a memory sub-system. A second set of host data items are programmed to second memory pages residing at the first region. A determination is made that a sequence at which the first set of host data items and the second set of host data items are programmed does not correspond to a target sequence associated with the memory sub-system. One or more of the first set of host data items are copied from one or more first memory pages to a second region of the memory sub-system that is allocated to store host data items initially programmed to first memory pages at the memory sub-system. One or more of the second set of host data items are copied from one or more second memory pages to a third region of the memory sub-system to store host data items that are programmed to second pages at the memory sub-system. A sequence of the copied one or more of the first set of host data items at the second region and the copied one or more of the second set of host data items at the third region correspond to the target sequence.

20 Claims, 7 Drawing Sheets

(52) U.S. Cl.
     CPC .......... _G06F 3/0659_ (2013.01); _G06F 3/0673_
                   (2013.01); _G06F 12/0253_ (2013.01)

(56)                References Cited

U.S. PATENT DOCUMENTS

2015/0242310 A1 *   8/2015   Guo .................... G06F 12/0246
                                                                 711/103
2016/0085455 A1 *   3/2016   Cohen ................... G06F 3/0611
                                                                 711/103

* cited by examiner

Program a first set of host data items to lower memory pages residing at a first region of a memory sub-system 210

Program a second set of host data items to higher memory pages residing at the first region of the memory sub-system 212

Determine that a sequence at which the first set of host data items and the second set of host data items are programmed does not correspond to a target sequence associated with the memory sub-system 214

Copy one or more of the first set of host data items from one or more lower memory pages to a second region of the memory sub-system 216

Copy one or more of the second set of host data items from one or more higher memory pages to a third region of the memory sub-system 218

LUN 310A

| LP 312 | UP 314 | XP 316 |
|---|---|---|
| 0 | 24 | 25 |
| 1 | 26 | 27 |
| 2 | 28 | 29 |
| 3 | 30 | 31 |
| 4 | 32 | 33 |
| 5 | 34 | 35 |

LUN 310B

| LP 312 | UP 314 | XP 316 |
|---|---|---|
| 6 | 36 | 37 |
| 7 | 38 | 39 |
| 8 | 40 | 41 |
| 9 | 42 | 43 |
| 10 | 44 | 45 |
| 11 | 46 | 47 |

LUN 310C

| LP 312 | UP 314 | XP 316 |
|---|---|---|
| 12 | 48 | 49 |
| 13 | 50 | 51 |
| 14 | 52 | 53 |
| 15 | 54 | 55 |
| 16 | 56 | 57 |
| 17 | 58 | 59 |

LUN 310D

| LP 312 | UP 314 | XP 316 |
|---|---|---|
| 18 | 60 | 61 |
| 19 | 62 | 63 |
| 20 | 64 | 65 |
| 21 | 66 | 67 |
| 22 | 68 | 69 |
| 23 | 70 | 71 |

LUN 310X

| LP 312 | UP 314 | XP 316 |
|---|---|---|
| 0 | 1 | 2 |
| 3 | 4 | 5 |
| 6 | 7 | 8 |
| 9 | 10 | 11 |
| 12 | 13 | 14 |
| 15 | 16 | 17 |

LUN 310X+1

| LP 312 | UP 314 | XP 316 |
|---|---|---|
| 18 | 19 | 20 |
| 21 | 22 | 23 |
| 24 | 25 | 26 |
| 27 | 28 | 29 |
| 30 | 31 | 32 |
| 33 | 34 | 35 |

LUN 310X+2

| LP 312 | UP 314 | XP 316 |
|---|---|---|
| 36 | 37 | 38 |
| 39 | 40 | 41 |
| 42 | 43 | 44 |
| 45 | 46 | 47 |
| 48 | 49 | 50 |
| 51 | 52 | 53 |

LUN 310X+3

| LP 312 | UP 314 | XP 316 |
|---|---|---|
| 54 | 55 | 56 |
| 57 | 58 | 59 |
| 60 | 61 | 62 |
| 63 | 64 | 65 |
| 66 | 67 | 68 |
| 69 | 70 | 71 |

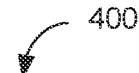

400

Program a first set of host data items to lower memory pages associated with a first set of memory cells 410

Program a second set of host data items to higher memory pages associated with the first set of memory cells 412

Detect that a host data item of at least one of the first set of host data items or the second set of host data items is invalid 414

Perform a memory maintenance operation at the one or more memory devices to remove the invalid data item from the memory sub-system, the media management operation including: 416

Copying valid host data items of the first set of host data items from the lower memory pages to a second set of memory cells 418

Copying valid host data items of the second set of host data items from the higher memory pages to a third set of memory cells 420

LUN 310A

| LP 312 | UP 314 | XP 316 |
|---|---|---|
| 0 | 24 | 25 |
| 1 | 26 | 27 |
| 2 | 28 | 29 |
| 3 | 30 | 31 |
| 4 | 32 | 33 |
| 5 | 34 | 35 |

LUN 310B

| LP 312 | UP 314 | XP 316 |
|---|---|---|
| 6 | 36 | 37 |
| 7 | 38 | 39 |
| 8 | 40 | 41 |
| 9 | 42 | 43 |
| 10 | 44 | 45 |
| 11 | 46 | 47 |

LUN 310C

| LP 312 | UP 314 | XP 316 |
|---|---|---|
| 12 | 48 | 49 |
| 13 | 50 | 51 |
| 14 | 52 | 53 |
| 15 | 54 | 55 |
| 16 | 56 | 57 |
| 17 | 58 | 59 |

LUN 310D

| LP 312 | UP 314 | XP 316 |
|---|---|---|
| 18 | 60 | 61 |
| 19 | 62 | 63 |
| 20 | 64 | 65 |
| 21 | 66 | 67 |
| 22 | 68 | 69 |
| 23 | 70 | 71 |

LUN 310X

| LP 312 | UP 314 | XP 316 |
|---|---|---|
|  | 552 |  |
|  |  |  |
|  |  |  |
|  |  |  |
|  |  |  |
|  |  |  |

LUN 310X+1

| LP 312 | UP 314 | XP 316 |
|---|---|---|
|  |  |  |
|  |  |  |
|  |  |  |
|  |  |  |
|  |  |  |
|  |  |  |

LUN 310X+2

| LP 312 | UP 314 | XP 316 |
|---|---|---|
|  | 554 |  |
|  |  |  |
|  |  |  |
|  |  |  |
|  |  |  |
|  |  |  |

LUN 310X+3

| LP 312 | UP 314 | XP 316 |
|---|---|---|
|  |  |  |
|  |  |  |
|  |  |  |
|  |  |  |
|  |  |  |
|  |  |  |

FIG. 5B

| LUN 310X | | | LUN 310X+1 | | | LUN 310X+2 | | | LUN 310X+3 | | |
|---|---|---|---|---|---|---|---|---|---|---|---|
| LP 312 | UP 314 | XP 316 | LP 312 | UP 314 | XP 316 | LP 312 | UP 314 | XP 316 | LP 312 | UP 314 | XP 316 |
| 0 | 1 | 2 | 18 | 19 | 20 | 24 | 25 | 26 | 62 | 63 | 64 |
| 3 | 4 | 5 | 21 | 22 | 23 | 26 | 28 | 29 | 65 | 66 | 67 |
| 6 | 7 | 8 | | 552 | | 50 | 51 | 52 | 68 | 69 | 70 |
| 9 | 10 | 11 | 21 | | | 53 | 54 | 55 | 71 | | 554 |
| 12 | 13 | 14 | | | | 56 | 57 | 58 | | | |
| 15 | 16 | 17 | | | | 59 | 60 | 61 | | | |

RESEQUENCING DATA PROGRAMMED TO MULTIPLE LEVEL MEMORY CELLS AT A MEMORY SUB-SYSTEM

RELATED APPLICATIONS

This application claims the benefit of U.S. Provisional Patent Application No. 63/292,926, filed Dec. 22, 2021, the entirety of which is incorporated herein by reference.

TECHNICAL FIELD

Embodiments of the disclosure relate generally to memory sub-systems, and more specifically, relate to resequencing data programmed to multiple level memory cells at a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is a flow diagram of an example method for resequencing data programmed to multiple level memory cells at a memory sub-system, in accordance with some embodiments of the present disclosure.

FIGS. 3A-3B depict an example of resequencing data programmed to multiple level memory cells at a memory sub-system, in accordance with some embodiments of the present disclosure.

FIG. 4 is a flow diagram of an example method for resequencing data programmed to multiple level memory cells at a memory sub-system via a memory management protocol, in accordance with some embodiments of the present disclosure.

FIGS. 5A-C depict an example of resequencing data programmed to multiple level memory cells at a memory sub-system via a memory management protocol, in accordance with some embodiments of the present disclosure.

DETAILED DESCRIPTION

Figure 1:
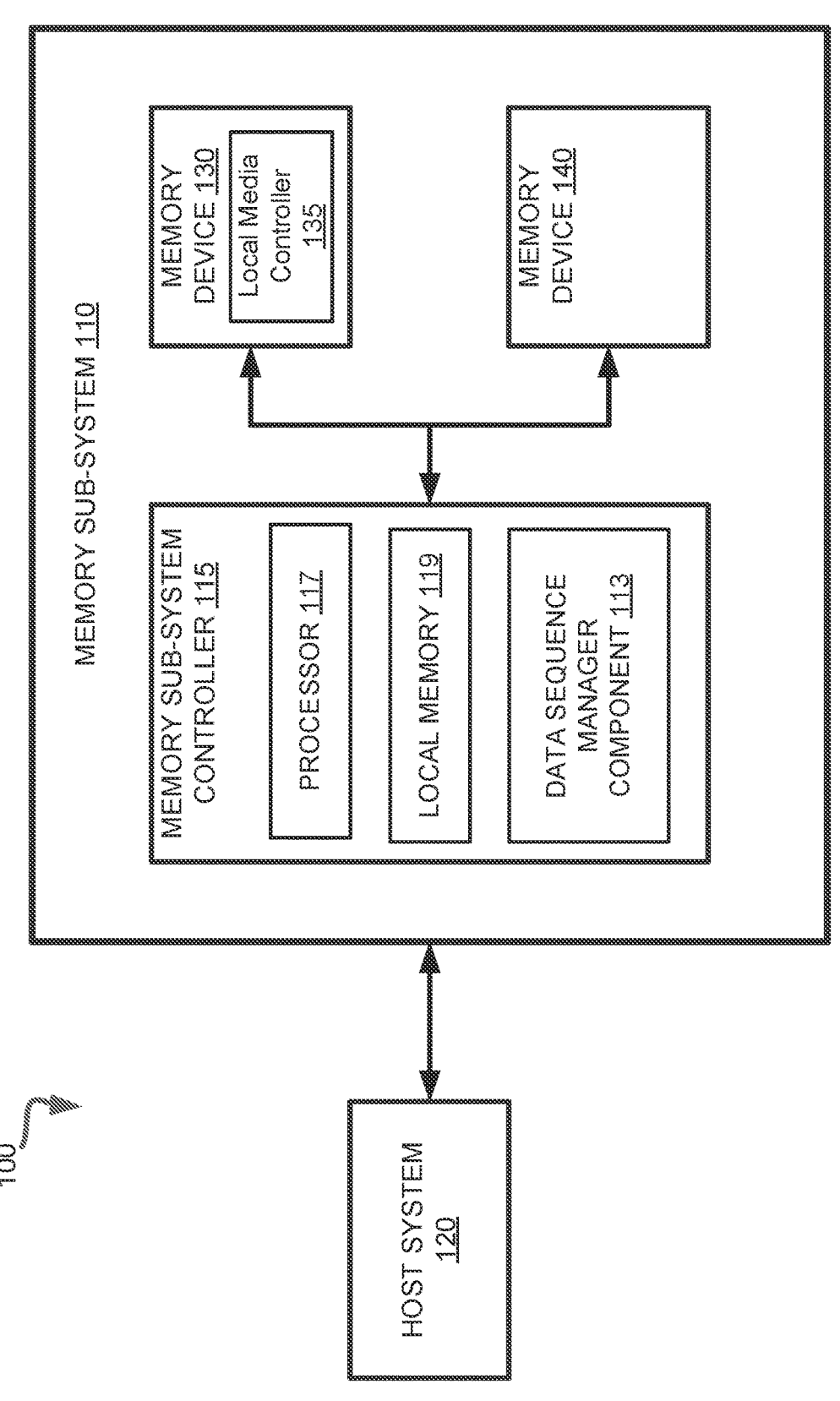
FIG. 1 illustrates an example computing system that includes a memory sub-system, in accordance with some embodiments of the present disclosure.

Aspects of the present disclosure are directed to resequencing data programmed to multiple level memory cells at a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. "Block" herein shall refer to a set of contiguous or non-contiguous memory pages. An example of a "block" is an "erasable block," which is the minimal erasable unit of memory, while "page" is a minimal writable unit of memory. Each page corresponds to a set of memory cells. A memory cell is an electronic circuit that stores information. In some instances, memory cells can be single level cells (SLCs) that are configured to store a single bit of data (e.g., a single data item, etc.). In other instances, memory cells can be configured to store multiple bits of data. For example, memory cells can be multi-level cells (MLCs), triple-level cells (TLCs), or quad-level cells (QLCs) (collectively referred to herein as XLCs or multiple level cells). Each memory cell type can have a different data density, which corresponds to an amount of data (e.g., bits of data, etc.) that can be stored per memory cell).

Data operations can be performed by the memory sub-system. The data operations can be host-initiated operations. For example, the host system can initiate a data operation (e.g., write, read, erase, etc.) on a memory sub-system. The host system can send access requests (e.g., a programming command, a read command, etc.) to the memory sub-system, such as to store data on a memory device at the memory sub-system and to read data from the memory device on the memory sub-system. The data to be read or written, as specified by a host request, is hereinafter referred to as "host data." A host request can include a logical address (e.g., a logical block address (LBA) and namespace) for the host data, which is the location that the host system associates with the host data. The logical address information (e.g., LBA, namespace) can be part of metadata for the host data. A host data item, as used herein, refers to a unit of host data (e.g., one or more bits of host data) that is associated with a respective logical address (e.g., as provided by the host system).

As indicated above, a host system can transmit host data to a memory sub-system for programming to the memory sub-system. A respective host data item of the incoming host data can, in some instances, be associated with a logical address (e.g., a LBA, etc.) which correspond to a sequence or ordering of the host data (e.g., as defined by the host system. For example, the host system can provide host data associated with a text file. A first host data item of the provided host data can correspond to a first line of text of the text file and can be assigned a first logical address, a second host data item can correspond to a second line of the text file and can be assigned a second logical address, and so forth.

In some systems, a controller for a memory sub-system can program incoming host data to memory devices of the memory sub-system in an SLC mode (i.e., program the incoming host data to available SLCs residing at the memory sub-system). As SLCs are associated with only two programming voltages (e.g., one programming voltage to program a bit value of "1" to the memory cell and another programming voltage to program a bit value of "0" to the memory cell), the memory sub-system controller can program the host data to the SLCs relatively quickly (e.g., compared to programming data to XLCs). However, as SLCs are configured to only store one bit of information, the number of available memory cells to store host data can be quickly reduced. As the memory sub-system runs out of available memory cells to store the incoming host data, the memory sub-system controller can perform a memory management operation (e.g., a garbage collection operation) to reprogram the host data in an XLC mode (i.e., copy the programmed host data from the SLCs to XLCs residing at the memory sub-system). Reprogramming the host data in XLC mode involves reading the programmed host data from the SLCs, copying the read host data to XLCs at the memory sub-system, and erasing the host data programmed to the SLCs so the SLCs can be reused to store data programmed in XLC mode. Accordingly, reprogramming the host data in XLC mode consumes a significant amount of system resources (e.g., program/erase (PE) cycles for the memory cells, processing cycles of the memory sub-system controller, etc.) and can take a significant amount of time. In some instances, the memory sub-system can fail to meet performance criteria defined by the host system (e.g., as the overall amount of time taken to program the host data in SLC mode and then reprogram the host data in XLC mode exceeds a threshold amount of time, etc.).

Some memory sub-systems can implement a first pass caching scheme to avoid programming the host data in SLC mode and subsequently reprogramming the host data in XLC mode. Each level of an XLC residing at the memory sub-system can correspond to one or more memory pages available to store host data (referred to herein as a memory page level). For example, a MLC can be configured to store a first bit of data programmed using a first programming voltage and a second bit of data programmed using a second programming voltage. The first programming voltage used to program the first bit of data can be lower than the second programming voltage used to program the second bit of data. Accordingly, the first bit is referred to herein as a lower bit and the second bit is referred to herein as an upper bit. In another example, a TLC can be configured to store a first bit of data using a first programming voltage. The TLC can also be configured to store a second bit of data and a third bit of data using a second programming voltage. The first programming voltage used to program the first bit of data can be lower than the second programming voltage used to program the second and third bits of data. The first bit is referred to herein as a lower bit, the second bit is referred to herein as an upper bit, and the third bit is referred to herein as a higher bit or an extra bit. A memory sub-system controller can program data to memory pages that use particular bits of memory cells. For example, the memory sub-system controller can program data items to pages that utilize lower bits (referred to herein as lower memory pages), pages that utilize upper bits (referred to herein as upper memory pages), and/or extra bits (referred to herein as extra memory pages). Memory pages that utilize upper bits and/or extra bits are also referred to herein as higher memory pages, in some instances.

The controllers for some memory sub-systems can program incoming host data to lower memory pages at the memory sub-system (referred to herein as a first programming pass of the incoming host data). As each memory cell of the lower memory pages stores a single bit of data, the memory sub-system controller can program the lower memory pages by applying one of two programming voltages (e.g., one programming voltage to program a bit value of "1" to the memory cell and another programming voltage to program a bit value of "0" to the memory cell), which is similar to programming a SLC. Once data is programmed to the lower memory pages, the memory sub-system controller can program the incoming host data to higher memory pages (e.g., upper memory pages, extra memory pages, etc.) at the memory sub-system (referred to herein as a second programming pass of the incoming host data). To program higher memory pages, the memory sub-system controller can apply a programming voltage that is higher than the programming voltage used to program the lower memory page of one or more memory cells. The higher programming voltage can correspond to the data item(s) programmed to the higher memory page(s) at the memory sub-system.

As indicated above, the first pass caching scheme enables the memory sub-system controller to program incoming host data to memory cells of the memory sub-system without initially programming the host data in SLC mode and reprogramming the host data in XLC mode. However, the ordering of logical addresses for host data items programed to the lower and higher memory pages of a respective logical unit (LUN) (e.g., a block, a die, etc.) of the memory sub-system according to the first pass caching scheme does not correspond to a sequential ordering of the logical addresses. Accordingly, host data programmed to the memory sub-system according to the first pass caching scheme is not programmed sequentially at a respective memory device or across memory devices of the memory sub-system. As the ordering of the logical addresses for host data items is not programmed sequentially at the memory devices, the host data can be fragmented across the memory sub-system (e.g., as host data becomes invalid and is removed or erased from the memory sub-system). For example, the host data item(s) programmed to lower memory pages can be associated with a first file (e.g., a text file, a media file, etc.), which is different from a second file associated with host data item(s) programmed to higher pages. If the host system requests to remove the second file from the memory sub-system, the memory sub-system controller can determine that the host data item(s) programmed to the higher memory pages of the set of memory cells are invalid (i.e., the data item(s) no longer include valid data and are not to be utilized or referenced by the host system). The host data item(s) for the first file (i.e., programmed to the lower pages) can remain valid. The memory sub-system controller can remove the host data item(s) for the second file from the higher memory pages (e.g., during a garbage collection operation). New incoming host data can be programmed to the available higher memory pages. However, if the incoming host data includes host data item(s) for a third file that is larger than the removed second file, the memory sub-system controller can only program a portion of the host data item(s) to the higher memory pages and will program the remaining portion of the host data item(s) to other memory cells of the memory sub-system. Accordingly, the host data item(s) for the third file is fragmented across the memory sub-system.

As host data becomes fragmented across the memory sub-system, the memory sub-system controller can perform a significant amount of memory access operations to access the fragmented host data. Accordingly, a write amplification (i.e., a metric comparing a number of writes for data requested by the host system and the number of writes for the data performed by the memory sub-system controller) can be significantly increased, which can cause the memory sub-system to fail to meet performance criteria defined by the host system. Additionally, a larger number of memory access operations can be performed to access the fragmented data across the memory devices compared to a smaller number of memory access operations that would be performed if the data was programmed sequentially across the memory devices. The larger number of memory access operations increases the consumption of memory sub-system resources (e.g., processing cycles, etc.), which can decrease an overall system efficiency and increase an overall system latency.

Aspects of the present disclosure address the above and other deficiencies by providing a scheme for resequencing data programmed to multiple level memory cells at a memory sub-system. In some embodiments, a memory sub-system controller can receive host data for programming to the memory sub-system. Each host data item of the received host data can be associated with a respective logical address, which corresponds to a sequence or ordering of the host data (e.g., as defined by the host system). The memory sub-system can include lower memory pages (i.e., memory pages that store data via a lower bit of memory cells) and one or more higher memory pages (i.e., memory pages that store data via upper bit(s) of memory cells). The memory sub-system controller can program a first set of the host data items to the lower memory pages associated with a first set of memory cells (e.g., a block, etc.) of the memory sub-system and a second set of the host data items to the higher memory pages (e.g., upper memory pages, extra memory pages, etc.) associated with the first set of memory cells (i.e., in accordance with the first pass caching scheme). The first set of host data items can be sequentially programmed (i.e., in accordance with an ordering of the logical addresses for the first set of host data items) to the lower memory pages and the second set of host data items can be sequentially programmed to the higher memory pages. Further details regarding the sequential programming to the lower and higher memory pages of the memory cells are provided herein.

In some embodiments, the memory sub-system controller can detect that the sequence at which the first set of host data items and the second set of host data items are programmed across the memory sub-system does not correspond to a target sequence. The target sequence can correspond to a sequence associated with minimizing data fragmentation of host across the memory device(s) of the memory sub-system responsive to one or more host data items of the first set of host data items or the second set of host data items becoming invalid. Data fragmentation occurs when a collection of data items in memory are broken up into many pieces that are not close together. Further details regarding the target sequence are provided herein. Responsive to detecting that the sequence at which the first and second sets of host data items are programmed does not correspond to the target sequence, the memory sub-system controller can copy one or more of the first set of host data items from one or more lower memory pages to memory pages (e.g., lower memory pages, upper memory pages, extra memory pages, etc.) of a second set of memory cells residing at a region of the memory sub-system that is allocated to store host data items that were initially programmed to lower memory pages at the memory sub-system. The memory sub-system controller can also copy one or more of the second set of host data items from the one or more higher memory pages to memory pages (e.g., lower memory pages, upper memory pages, extra memory pages, etc.) of a third set of memory cells residing at a region of the memory sub-system allocated to store host data items that were initially programmed to higher memory pages at the memory sub-system. The host data items can be copied in accordance with the target sequence.

In additional or alternative embodiments, the memory sub-system controller can detect that one or more of the first set of host data items (i.e., programmed to the lower memory pages) or the second set of host data items (i.e., programmed to the higher memory pages) are invalid. The memory sub-system controller can perform a memory management operation (e.g., a garbage collection operation) to remove or erase the invalid data from the memory sub-system. The memory management operation can include copying the valid host data from the lower memory pages associated with the first set of memory cells to the second set of memory cells (i.e., at the first region) and/or the valid host data from the higher memory pages associated with the first set of memory cells to the third set of memory cells (i.e., at the second region), in accordance with previously described embodiments. The sequence that the valid data is copied to the second set of memory cells and/or the third set of memory cells can correspond to the target sequence. In some embodiments, the second set of memory cells can be indicated by a cursor (e.g., a pointer, etc.) configured to indicate memory cells that are available to store data programmed to lower memory pages of the memory sub-system. The third set of memory cells can be indicated by a cursor configured to indicate memory cells that are available to store data programed to higher memory pages of the memory sub-system.

Advantages of the present disclosure include, but are not limited to, providing a scheme that enables a memory sub-system controller to resequencing data items programmed to memory pages of multiple level memory cells at a memory sub-system that were not programmed according to a target sequence or ordering. By enabling the controller to resequence data items programmed to memory pages associated with XLCs during a first pass programming scheme, the memory sub-system controller can sequentially distribute the host data items at and across memory devices of the memory sub-system, according to a target sequence. By programming the host data items according to the target sequence, data fragmentation is minimized at the memory sub-system, and a write amplification at the memory sub-system is decreased, which can cause the memory sub-system to meet the performance criteria defined by the host system. In addition, since the data fragmentation at the memory sub-system is minimized, fewer computing resources are consumed to access host data, which can increase an overall system efficiency and decrease an overall system latency.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

Memory cells residing at memory devices 130, 140 can be configured to store multiple bits of data, in some embodiments. For example, memory cells residing at memory devices 130, 140 can be MLCs (i.e., memory cells configured to store two bits of data), TLCs (i.e., memory cells configured to store three bits of data), QLCs (i.e., memory cells configured to store three bits of data), and so forth. Lower memory pages refer to memory pages that utilize lower bits of a memory cell (e.g., a first bit that can be programmed via a first voltage). Higher memory pages refer to memory pages that utilize higher bits (e.g., upper bits, extra bits) of a memory cell (e.g., which can be programmed via a second voltage that is higher than the first voltage).

As indicated above, memory sub-system controller 115 can program the lower memory page of a memory cell by applying a first voltage to the memory cell. As the lower memory page is configured to store a single bit of data, memory sub-system controller 115 can program the lower memory page by applying one of two programming voltages (e.g., one programming voltage to program a bit value of "1" to the memory cell and/or another programming voltage to program a bit value of "0" to the memory cell), in some embodiments. In other or similar embodiments, the state of the memory cell prior to programming can correspond to a particular data bit value (e.g., "0," "1"). Accordingly, memory sub-system controller 115 can program the lower memory page by applying a programming voltage corresponding to an opposite data bit value (e.g., "1," "0") or by not applying any programming voltage (or applying a baseline programming voltage) to the memory cell. Memory sub-system controller 115 can program the higher memory page(s) by applying a second voltage to a memory cell after the lower memory page is programmed. The second voltage can be a higher voltage than the first voltage used to program the lower memory page. The second voltage can correspond to particular data bit value(s) associated with the additional data item(s) programmed to the higher memory page(s).

In one embodiment, the memory sub-system 110 includes a data sequence manager component 113 (referred to as data sequence manager 113) that can manage a sequence of data (e.g., host data) that is programmed across one or more memory devices 130, 140 of memory sub-system 110. In some embodiments, the memory sub-system controller 115 includes at least a portion of the data sequence manager component 113. For example, the memory sub-system controller 115 can include a processor 117 (processing device) configured to execute instructions stored in local memory 119 for performing the operations described herein. In some embodiments, the data sequence manager component 113 is part of the host system 120, an application, or an operating system.

As described above, host system 120 can provide host data for programming to memory devices 130, 140 of memory sub-system 110. In some embodiments, memory sub-system controller 115 can program incoming host data items to the lower memory pages residing at one or more regions of memory devices 130, 140. Once the incoming host data items are programmed to each of the lower memory pages residing at the one or more regions, memory sub-system controller 115 can program incoming host data items to one or more higher memory pages (e.g., upper memory pages, extra memory pages, etc.) of the memory cells at the one or more regions. In some embodiments, each host data item can be associated with a logical address (e.g., a LBA) that corresponds to a sequence associated with the data items (e.g., as defined by host system 120). For example, one or more data items can correspond to a file, where a first data item having a first logical address corresponds to a first line of text of the first file and a second data item having a second logical address corresponds to a second line of text of the first file.

As the incoming host data items are programmed to the lower memory pages before being programmed to the higher memory pages, the memory sub-system controller 115 can program the host data according to a sequence that does not correspond to a target sequence at and/or across memory devices 130, 140, in some embodiments. The target sequence can correspond to a sequence associated with minimizing data fragmentation for host data programmed across memory devices 130, 140 of memory sub-system 110. As indicated above, data fragmentation occurs when a collection of data items in memory are broken up into many pieces that are not close together. In an illustrative example, memory sub-system controller 115 can program host data items having logical addresses of "0" through "5" to lower memory pages of a set of memory cells at a first region of memory sub-system 110. Host data items having logical addresses of "24" through "35" to higher memory pages of the set of memory cells (e.g., as illustrated in FIG. 3A). The host data items having logical addresses of "6" through "11" can be programmed to lower memory pages at a second region of memory sub-system 110. Host data items having logical addresses of "36" through "47" can be programmed to higher memory pages of the second region. (e.g., as also illustrated in FIG. 3A). As the host data items having logical addresses "0" through "5" are programmed to memory cells residing at a different region than the memory cells storing host data items having logical addresses "6" through "11," such host data items are fragmented across the memory sub-system 110. Data items having logical addresses of "24" through "35" are also fragmented from host data items having logical addresses of "36" through "47," as such host data items are also programmed to memory cells residing at different regions. Accordingly, the sequence of the host data items having logical addresses of "0" through "47" programmed to memory devices 130, 140 does not correspond to the target sequence.

Data sequence manager 113 can be configured to implement a scheme for resequencing data items programmed to XLCs residing at memory devices 130, 140 to correspond to a target sequence. In some embodiments, data sequence manager 113 can determine that a sequence that data is programmed to the lower and higher memory pages at or across memory devices 130, 140 does not correspond to a target sequence. In response to determining that the sequence does not correspond to the target sequence, data sequence manager 113 can copy a set of data items programmed to lower memory pages to memory pages (e.g., lower memory pages, upper memory pages, extra memory pages, etc.) at a first region of memory sub-system 110 that are allocated to store data items initially programmed to lower memory pages. Data sequence manager 113 can additionally or alternatively copy a set of data items programmed to higher pages to memory pages at a second region of memory sub-system 110 that is allocated to store data items initially programmed to higher memory pages. The data items can be copied to the first region and/or the second region according to the target sequence. In some embodiments, data sequence manger 113 can copy the data items to the first region and/or the second region during performance of a memory management operation (e.g., a garbage collection operation, etc.). Data sequence manager 113 can identify the first region based on a first cursor configured to indicate memory cells of memory devices 130, 140 that are available to store data initially programmed to lower memory pages, in some embodiments. In additional or alternative embodiments, data sequence manager 113 can identify the second region based on a second cursor configured to indicate memory cells that are available to store data initially programmed to higher memory pages. Further details regarding the target sequence and resequencing the host data items are provided herein.

FIG. 2 is a flow diagram of an example method 200 for resequencing data programmed to multiple level memory cells at a memory sub-system, in accordance with embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more operations of method 200 are performed by the memory sub-system controller 115 of FIG. 1. For example, one or more operations of method 200 can be performed by data sequence manager 113. One or more operations of method 200 is performed by another component of the memory sub-system controller 115, or by a component of local media controller 135, in additional or alternative embodiments. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 210, processing logic programs a first set of host data items to lower memory pages residing at a first region of a memory sub-system. As described above, memory cells of a memory sub-system, such as memory sub-system 110 of FIG. 1, can be configured to store multiple bits of data. For example, memory cells of memory sub-system 110 can be XLCs, which can include MLCs, TLCs, QLCs, and so forth. Each level of a multiple level cell can correspond to a respective memory page. For example, a first level of a XLC can correspond to a lower memory page. The first level of the XLC can be configured to store a first bit of programmed data. One or more additional levels of the XLC can correspond to higher memory pages (e.g., upper memory pages, extra memory pages, etc.). The additional levels of the XLC can be configured to store additional bits of data programmed to the XLC (e.g., a second bit for MLCs, a second and third bit for TLCs, a second, third, and forth bit for QLCs, etc.). Memory sub-system controller 115 can program incoming host data items to the lower memory pages residing at a first region of the memory sub-system 110, as described above.

At block 212, processing logic programs a second set of host data items to higher memory pages residing at the first region. In some embodiments, processing logic (e.g., memory sub-system controller 115) can program the second set of host data items to the upper memory pages, extra memory pages, etc. of the first region. Memory sub-system controller 115 can program the incoming host data items to the higher memory pages responsive to determining that no lower memory pages of the first set of memory cells are available to store the incoming host data, in some embodiments. FIG. 3A illustrates host data items programmed to lower and higher memory pages, in accordance with embodiments of the present disclosure. FIG. 3A depicts a first region 300 of a memory sub-system, such as memory sub-system 110 of FIG. 1. In accordance with previously described embodiments, region 300 can include one or more LUNs 310 (e.g., LUN 310A, 310B, 310C, 310D, etc.), which can each correspond to a respective die, block, etc. of memory sub-system 110. For purposes of explanation only, LUNs 310A-D illustrated in FIG. 3A can each correspond to respective blocks residing on memory devices 130, 140 of memory sub-system 110. However, it should be noted that LUNs 310A-D can correspond to any grouping of memory cells, in accordance with embodiments of the present disclosure. In some embodiments, memory sub-system controller 115 can allocate region 300 to store host data items that are initially programmed to memory sub-system 110. Further details regarding allocating regions of memory sub-system 110 are provided herein.

As described above, a host system, such as host system 120, can transmit host data items for programming to memory sub-system 110. Each of the host data items can be associated with a logical address (e.g., a LBA), which corresponds to a sequence or ordering of the host data items, as defined by host system 120. Memory sub-system controller 115 can program the host data items received from host system 120 to a respective memory page of LUN 310A-D, in some embodiments. Each memory cell of LUNs 310 can correspond to two or more types of memory pages. For example, a respective memory cells can be configured to store a first bit of data, which corresponds to a lower memory page, and additional bits of data, which correspond to higher memory pages, as described above. For purposes of explanation only, memory cells of LUNs 310A-D of FIG. 3A can each correspond to a lower memory page 312, an upper memory page 314, and an extra memory page 316. However, it should be noted that LUNs 310A-D can correspond to any number of memory pages, in accordance with embodiments of the present disclosure.

Memory sub-system controller 115 can program a first set of incoming host data items to the lower memory pages 312 of LUNs 310A-D. As described above, memory sub-system controller can program host data items to lower memory pages 312 by applying a first programming voltage to each of the memory cells of LUNs 310A-D. The first programming voltage can correspond to a first bit value for the respective memory cell (e.g., "0" or "1"). In some embodiments, memory sub-system controller 115 can program the first set of host data items sequentially across the lower memory pages 312 of LUNs 310A-D. For example, as illustrated in FIG. 3A, memory sub-system controller 115 can program host data items associated with logical addresses "0" through "5" across the lower memory pages 312 of LUN 310A, host data items associated with logical addresses "6" through "11" across lower memory pages 312 of LUN 310B, host data items associated with logical addresses "12" through "17" across lower memory pages 312 of LUN 310C, and host data items associated with logical addresses "18 through 23" across lower memory pages 312 of LUN 310D. Responsive to programming the host data items to the lower memory pages 312 of LUNs 310A-D, memory sub-system controller 115 can program a second set of incoming host data to higher memory pages (e.g., upper memory page 314, extra memory page 316, etc.) across LUNs 310A-D. In some embodiments, memory sub-system controller 115 can program the second set of host data items sequentially across the upper memory pages 314 and the extra memory pages 316. For example, as illustrated in FIG. 3A, memory sub-system controller can program host data items associated with logical addresses "24" through "35" across upper memory pages 314 and extra memory pages 316 of LUN 310A, host data items associated with logical addresses "36" through "47" across upper memory pages 314 and extra memory pages 316 of LUN 310B, host data items associated with logical addresses "48" through "59" across upper memory pages 314 and extra memory pages 316 of LUN 310C, and host data items associated with logical addresses "60" through "70" across upper memory pages 314 and extra memory pages 316 of LUN 310D.

Referring back to FIG. 2, at block 214, processing logic (e.g., data sequence manager 113) determines that a sequence at which the first set of host data items and the second set of host data items are programmed across the lower memory pages and the higher memory pages does not correspond to a target sequence associated with the memory sub-system. As indicated above, the target sequence can correspond to a sequence associated with minimizing data fragmentation of host data across memory devices 130, 140 of memory sub-system 110. In an illustrative example, a target sequence can correspond to a sequence where a set of host data items are programmed sequentially across each memory page of a respective LUN 310 of memory sub-system 110.

In some embodiments, data sequence manager 113 can determine that the sequence of the first and second sets of host data items programmed across region 300 does not correspond to the target sequence based on mappings between the logical addresses associated with each of the first and second sets of host data items and the physical addresses associated with the memory cells that store each of the first and second sets of host data items. In one illustrative example, data sequence manager 113 can parse through a logical-to-physical (L2P) data structure (e.g., maintained by memory sub-system controller 115) and determine that host data items associated with the logical addresses of "0," "24," and "25" are programmed to the memory pages (e.g., the lower memory page 312, the upper memory page 314, and the extra memory page 316, respectively) of a memory cell of LUN 310A. Data sequence manager 113 can further determine, based on the L2P data structure, that host data items associated with logical addresses of "1," "26," and "27" are programmed to the memory pages of a different memory cell of LUN 310A. As the host data items having sequential logical addresses "0" and "1" are programmed to different XLCs of the memory sub-system 110, data sequence manager 113 can determine that such host data items are fragmented. Accordingly, data sequence manager 113 can determine that the sequence of that the programmed host data items across memory cells of LUN 310A does not correspond to the targets sequence.

At block 216, processing logic (e.g., data sequence manager 113) copies one or more of the first set of host data items from one or more lower memory pages of the first set of memory cells to a second region of the memory sub-system. In some embodiments, a second set of memory cells can be allocated at a second region to store host data items that were initially programmed to lower memory pages 312 at region 300. At block 218, processing logic (e.g., data sequence manager 113) copies one or more of the second set of host data items from one or more higher memory pages to a third set of memory cells of the memory sub-system. In some embodiments, a third set of memory cells can be allocated at a third region to store host data items that were initially programmed to higher memory pages (e.g., upper memory pages 314, extra memory pages 316, etc.) at region 300. A sequence of the copied host data items at the second set of memory cells and/or the third set of memory cells can correspond to the target sequence. Data sequence manager 113 can copy the one or more of the first set of host data items and/or the one or more of the second set of host data items responsive to detecting an idle time period associated with incoming host data traffic, in some embodiments.

FIG. 3B illustrates a region 350 of memory sub-system 110 including memory cells that are allocated to store host data items that are copied from memory cells of region 300, according to embodiments of the present disclosure. In some embodiments, data sequence manager 113 (or another component of memory sub-system controller 115) can allocate memory cells of region 350 during an initialization of memory sub-system 110. For example, a developer, an operator, etc. of memory sub-system 110 can set one or more configuration settings for memory sub-system controller 115 to implement the first pass caching scheme when programming incoming host data to memory sub-system 110. During an initialization of memory sub-system 110, memory sub-system controller 110 can determine (e.g., based on the configuration settings) that the first pass caching scheme is to be implemented and can accordingly identify memory cells of region 300 to store incoming host data items and memory cells of region 350 to store resequenced host data items that are copied from region 300. In some embodiments, the allocated memory cells can correspond to memory cells that are associated with storing data items that are subject to a memory management operation (e.g., a garbage collection operation).

In some embodiments, data sequence manager 113 and/or another component of memory sub-system controller 115 can maintain one or more cursors (e.g., pointers) that indicate memory cells of memory sub-system 110 that are to store the host data items copied from region 300. For example, data sequence manager 113 can maintain a first cursor that is configured to indicate a set of memory cells that is to store host data items that were initially programmed to lower memory pages 312 of memory sub-system 110. Data sequence manager 113 can additionally or alternatively maintain a second cursor that is configured to indicate another set of memory cells that is to store host data items that were initially programmed to higher memory pages (e.g., upper memory pages 314, extra memory pages 316, etc.) of memory sub-system 110. In some embodiments the first cursor and/or the second cursor can be cursors associated with one or more memory management opera- tions (e.g., garbage collection cursors, etc.). Further details regarding the cursors are provided with respect to FIGS. 4-5B.

As illustrated in FIG. 3B, region 350 can include one or more LUNs 310 (e.g., LUN 310X, 310X+1, 310X2, 310X+ 3, etc.) and memory cells of each LUN 310 can correspond to a lower memory page 312, an upper memory page 314, and/or an extra memory page 316. It should be noted that although LUNs 310X-X+3 are described as different LUNs 310 from LUNs 310A-D of FIG. 3A, LUNs 310X-X+3 can be the same or similar to LUNs 310A-D, in some embodiments.

In some embodiments, data sequence manager 113 can determine a sequence to copy the host data items of the first and second set of host data items that corresponds to the target sequence. For example, data sequence manager 113 can determine a numerical ordering of the logical addresses of each of the first set of host data items (e.g., based on the L2P data structure), as described above. Data sequence manager 113 can determine the sequence that the first set of host data items is to be copied to memory cells of region 350 based on the determined numerical ordering of the logical addresses of each of the first set of host data items. In an illustrative example, data sequence manager 113 can deter- mine that host data items associated with logical addresses of "0" through "17," which are currently programmed to lower memory pages 312 of region 300, are to be pro- grammed to memory cells of LUN 310X (e.g., based on the numerical ordering of the logical addresses and the data capacity of the memory cells of LUN 310X). Data sequence manager 113 can further determine that host data items associated with logical addresses of "18" through "23," which are currently programmed to other lower memory pages 312 of region 300, are to be programmed to a portion of memory cells of LUN 310X+1 (e.g., based on the numerical ordering of the logical addresses and the data capacity of the memory cells of LUN 310X+1). Accord- ingly, data sequence manager 113 can copy the host data items from the lower memory pages 312 of region 300 to the memory cells of LUNs 310X and 310X+1 based on the determined ordering for such host data items. As illustrated in FIG. 3B, the host data items associated with logical addresses "0" through "23" are copied from the lower memory pages 312 of region 300 to the memory cells of LUNs 310X and 310X+1 of region 350.

Data sequence manager 113 can also determine a numeri- cal ordering of the logical addresses of each of the second set of host data items and can determine the sequence that the second set of host data items is to be copied to memory cells of region 350, in accordance with previously described embodiments. In an illustrative example, data sequence manager 113 can determine that host data items associated with logical addresses of "24" through "71," which are currently programmed to higher memory pages (e.g., upper memory pages 314, extra memory pages 316, etc.) of region 300, are to be programmed to available memory cells of LUN 310X+1 and memory cells of LUNs 310X+2 and 310X+3 based on the numerical ordering of the logical addresses and the data capacity of the memory cells of LUNs 310X+1, 310X+2, and 310X+3. Accordingly, data sequence manager 113 can copy the host data items from the higher memory pages of region 300 to the memory cells of LUNs 310X+1, 310X+2, and 310X+3 based on the determined ordering for such host data items. As illustrated in FIG. 3B, the host data items associated with logical addresses "24" through "35" are copied from higher memory pages of region 300 to available memory cells of LUN 310X+1, the host data items associated with logical addresses "36" through "53" are copied from higher memory pages of region 300 to memory cells of LUN 310X+2, and the host data items associated with logical addresses "54" through "71" are copied from higher memory pages of region 300 to memory cells of LUN 310X+3.

As illustrated in FIG. 3B, the sequence at which the first set of host data items and the second set of host data items are copied across region 350 of memory sub-system 110 corresponds to the target sequence because such sequence minimizes data fragmentation of the host data items at region 350. For example, host data items having logical addresses of "0" through "17" are programmed to memory cells of LUN 310X, instead of at lower memory pages 312 of memory cells across LUNs 310A, 310B, and 310C (e.g., as illustrated in FIG. 3A). Accordingly, such host data items are programmed sequentially across LUN 310X and are not fragmented across region 350, which corresponds to the target sequence.

FIG. 4 is a flow diagram of another example method 400 for resequencing data programmed to multiple level memory cells at a memory sub-system via a memory management protocol, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more operations of method 400 are performed by the memory sub-system controller 115 of FIG. 1. For example, one or more operations of method 200 can be performed by data sequence manager 113. One or more operations of method 200 can be performed by another component of the memory sub-system controller 115, or by a component of local media controller 135, in additional or alternative embodiments. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 410, processing logic programs a first set of host data items to lower memory pages associated with a first set of memory cells. At block 412, processing logic programs a second set of host data items to higher memory pages associated with the first set of memory cells. Processing logic (e.g., memory sub-system controller 115) can program the first set of host data items and the second set of host data items to the lower memory pages and higher memory pages, respectively, associated with the first set of memory cells, in accordance with embodiments described above.

At block 414, processing logic detects that a host data item of at least one of the first set of host data items or the second set of host data items is invalid. In some embodiments, data sequence manager 113 (or another component of memory sub-system controller 115) can detect that host system 150 has requested to invalidate the host data item of the first set of host data items and/or the second set of host data items. As described above, the host system 150 can request to invalidate a host data item by requesting to modify a data item that is programmed to memory sub-system 110, to erase a data item that is programmed to memory sub-system 110, and so forth.

FIG. 5A illustrates invalidated host data items that are programmed to a region 500 of memory sub-system 110, in accordance with embodiments of the present disclosure. Memory sub-system controller 115 can program host data items to the lower memory pages 312 and the higher memory pages (e.g., upper memory pages 314, extra memory pages 316, etc.) of region 500, in accordance with previously described embodiments. As illustrated in FIG. 5A, the sequence at which the first set of host data items are programmed to the lower memory pages 312 of region 500 and the second set of host data items are programmed to the higher memory pages (e.g., upper memory pages 314, extra memory pages 316, etc.) does not correspond to a target sequence. In one example, host system 120 can request that memory sub-system 110 invalidate host data items associated with logical addresses "30" through "49." For example, host data items associated with logical addresses "30" through "49" can correspond to a data object, such as a file. Host system 120 can transmit a request to memory sub-system 110 to erase the file from memory sub-system 110. The request to erase the file can correspond to a request to invalidate the host data items associated with logical addresses "30" through "49." Memory sub-system controller 115 can invalidate the host data items, in accordance with the request. In some embodiments, memory sub-system controller 115 can invalidate the host data items by updating metadata associated with the host data items to indicate that the host data items are no longer valid. As indicated in FIG. 5A, the invalidated host data items can be programmed to upper memory pages 314 and/or extra memory pages 316 of LUNs 310A-310B. Data sequence manager 113 can detect that the host data items associated with the file are invalidated.

Referring back to FIG. 4, at block 416, processing logic performs one or more memory management operations at the one or more memory devices to remove the invalid data item from the memory sub-system. The memory management operations can include operations included in blocks 418 and 420, in some embodiments. In some embodiments, the one or more memory management operations can include a garbage collection operation. In such embodiments, data sequence manager 113, or another component of memory sub-system controller 115 can copy valid data items from region 500 to one or more additional regions of memory sub-system 110 (e.g., as indicated by blocks 418 and 420) and can erase all data items from region 500 after copying.

FIG. 5B illustrates a region 550 of memory sub-system 110 that is to store garbage collected data copied from region 500, in accordance with embodiments of the present disclosure. Memory sub-system controller 115 can allocate region 550 to store garbage collected data in accordance with previously described embodiments. In some embodiments, data sequence manager 113, or another component of memory sub-system controller 115, can maintain one or more cursors configured to indicate memory cells of region 550 that are available to store garbage collected data items. In some embodiments, data sequence manager 113 can maintain a first cursor 552 configured to indicate one or more memory cells of region 550 that is available to store host data items that were originally programmed to lower memory pages 312 of region 500. Data sequence manager 113 can additionally or alternatively maintain a second cursor 554 that is configured to indicate one or more memory cells of region 550 that is available to store host data items that were originally programmed to higher memory pages (e.g., upper memory pages 314, extra memory pages 316, etc.) of region 500. The first cursor 552 and the second cursor 554 can be garbage collection cursors, in some embodiments. In some embodiments, first cursor 552 can indicate available memory cells at a first portion of region 550 (e.g., including LUNs 310X and/or 310X+1) and second cursor 554 can indicate available memory cells at a second portion of region 550 (e.g., including LUNs 310X+2 and/or 310X+3).

At block 418, processing logic copies valid host data items of the first set of host data items from the lower memory pages to a second set of memory cells. The second set of memory cells be allocated (e.g., by memory sub-system controller 115) to store host data items that were initially programmed to lower memory pages at the memory sub-system. In some embodiments, processing logic (e.g., data sequence manager 113) can identify the second set of memory cells based on a first cursor (e.g., cursor 552), as described above. Data sequence manager 113 can determine a sequence at which the valid host data items of the first set of host data items are to be copied to the memory cells indicated by cursor 552. In some embodiments, data sequence manager 113 can determine the sequence based on a numerical ordering of the logical addresses for each of the first set of data items, as previously described. The determined sequence can correspond to the target sequence, as described above. Responsive to determining the sequence at which the valid host data items of the first set of host data items are to be copied, data sequence manager 113 can copy such valid host data items from the lower memory pages 312 of region 500 to the memory cells indicated by cursor 552. FIG. 5C illustrated an example of valid host data items copied from region 500 to region 550, in accordance with embodiments of the present disclosure. As illustrated in FIG.

5C, data sequence manager 113 can copy valid host data items having logical addresses of "0" through "17" from lower memory pages 312 of region 500 to available memory cells of LUN 310X (e.g., as indicated by cursor 552). Data sequence manager 113 can also copy valid host data items having logical addresses of "18" through "23" from lower memory pages 312 of region 500 to available memory cells of LUN 310X+1. As illustrated in FIG. 5C, the sequence at which the valid host data items are programmed to LUNs 310X and 310X+1 correspond to the target sequence as the host data items are not fragmented across region 550.

Responsive to copying the valid host data items from lower memory pages 312 of region 500 to available memory cells of region 550, data sequence manager 113 can update the cursor 552 to indicate additional available memory cells of region 550 that are allocated to store host data originally programmed to lower memory pages 312 of region 500. For example, as illustrated in FIG. 5C, data sequence manager 113 can update cursor 552 to indicate available memory cells of LUN 310X+1.

Referring back to FIG. 4, at block 420, processing logic copies valid host data of the second set of host data items from the higher memory pages to a third set of memory cells. The third set of memory cells can be allocated (e.g., by memory sub-system controller 115) to store host data items that were initially programed to higher memory pages at the memory sub-system. In some embodiments, processing logic (e.g., data sequence manager 113) can identify the third set of memory cells based on a second cursor (e.g., cursor 554), as described above. Data sequence manager 113 can determine the sequence at which the valid host data items of the second set of host data items are to be copied to the memory cells indicated by cursor 554, in accordance with previously described embodiments. The determined sequence can correspond to the target sequence, as described above. Responsive to determining the sequence at which the valid host data items of the second set of host data items are to be copied, data sequence manager 113 can copy such valid host data items from higher memory pages of region 500 to the memory cells indicated by cursor 554. For example, as illustrated in FIG. 5C, data sequence manager 113 can copy valid host data items having logical addresses of "24" through "29" and "50" through "61" to available memory cells of LUN 310X+2 (e.g., as indicated by cursor 552). Data sequence manager 113 can also copy valid host data items having logical addresses of "62" through "71" to available data cells of LUN 310X+3. Data sequence manager 113 does not copy host data items having logical addresses of "30" through "49" to memory cells of region 550 because such host data items are invalid, as described above. As illustrated in FIG. 5C, the sequence at which the valid host data items are programmed to LUNs 310X+2 and 310X+3 correspond to the target sequence as the host data items are not fragmented across region 550.

After copying the valid host data items from the higher memory pages of region 550 to the available memory cells of LUNs 310X+2 and 310X+3, data sequence manager 113 can update the cursor 554 to indicate additional available memory cells of region 550, as described above. For example, data sequence manager 113 can update cursor 554 to indicate available memory cells of LUN 310X+3. In some embodiments, data sequence manager 113, or another component of memory sub-system 115, can remove (e.g., erase) the host data items from region 500 after the valid host data items are copied to memory cells of region 550.

Figure 6:
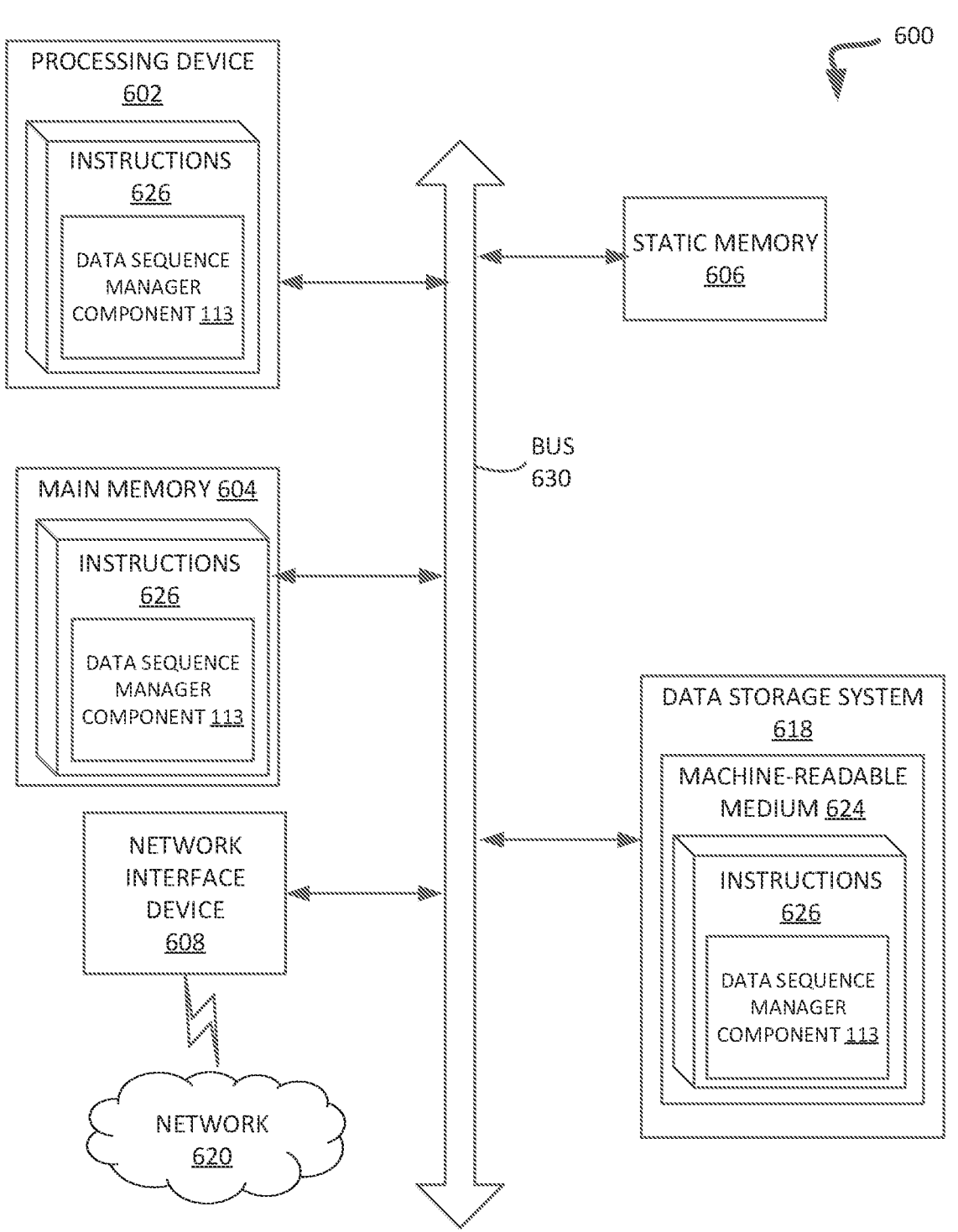
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data sequence manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to memory sub-system 110 of FIG. 1.

In one embodiment, the instructions 626 include instructions to implement functionality corresponding to a voltage bin boundary component (e.g., the data sequence manager component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   programming a first set of host data items to first memory pages residing at a first region of a memory sub-system;
   programming a second set of host data items to second memory pages residing at the first region;
   determining that a first sequence at which the first set of host data items and the second set of host data items are programmed does not correspond to a target sequence associated with the memory sub-system, wherein the target sequence is based on a numerical order of logical memory addresses of the first and second sets of host data items;
   copying one or more of the first set of host data items from one or more first memory pages to a second region of the memory sub-system allocated to store host data items that were initially programmed to first memory pages at the memory sub-system, wherein the second region is configured for lower memory pages, wherein the lower memory pages utilize a lower bit and are programmed using a first programming voltage; and
   copying one or more of the second set of host data items from one or more second memory pages to a third region of the memory sub-system allocated to store host data items that are programmed to second pages at the memory sub-system, wherein the third region is configured for higher memory pages, wherein the higher memory pages utilize an upper bit or an extra bit and are programmed using a second programming voltage that is higher than the first programming voltage, and wherein a second sequence of the copied one or more of the first set of host data items at the second region and the copied one or more of the second set of host data items at the third region correspond to the target sequence.

2. The method of claim 1, wherein the target sequence minimizes data fragmentation of host data across one or more memory devices of the memory sub-system.

3. The method of claim 1, wherein at least one of the one or more of the first set of host data items or the one or more of the second set of host data items are copied from the first region responsive to detecting an idle time period associated with incoming host data traffic.

4. The method of claim 1, wherein the first region of the memory sub-system and the second region of the memory sub-system correspond to regions associated with storing data items that are subject to a media management operation.

5. The method of claim 1, wherein the first memory pages correspond to a first memory page level of a first set of memory cells residing at the first region and the second memory pages to one or more second memory page levels of the first set of memory cells.

6. The method of claim 5, wherein the second memory pages correspond to at least one of upper memory pages or extra memory pages residing at the first region.

7. The method of claim 1, wherein the first region, the second region, and the third region of the memory sub-system each include at least one of a multi-level memory cell, a triple-level memory cell, or a quad-level memory cell.

8. A system comprising:
one or more memory devices; and
a processing device coupled to the one or more memory devices, wherein the processing device is to perform operations comprising:
programming a first set of host data items to first memory pages associated with a first set of memory cells residing at the one or more memory devices;
programming a second set of host data items to second memory pages associated with the first set of memory cells residing at the one or more memory devices;
detecting that a host data item of at least one of the first set of host data items programmed to a first memory page associated with the first set of memory cells or the second set of host data items programmed to a second memory page associated with the first set or memory cells is invalid; and
performing a memory management operation at the one or more memory devices to remove an invalid data item from the one or more memory devices, wherein performing the memory management operation comprises at least one of:
copying valid host data items of the first set of host data items from the first memory pages to a second set of memory cells allocated to store host data items that were initially programmed to first memory pages at the one or more memory devices in accordance with a target sequence, wherein the target sequence is based on a numerical order of logical memory addresses of the first and second sets of host data items, and wherein the second set of memory cells reside at a first region that is configured for lower memory pages, the lower memory pages utilizing a lower bit and are programmed using a first programming voltage, or
copying valid host data items of the second set of host data items from the second memory page to a third set of memory cells allocated to store host data items that were initially programmed to second memory pages at the one or more memory devices in accordance with the target sequence, wherein the third set of memory cells reside at a second region that is configured for higher memory pages, the higher memory pages utilizing an upper bit or an extra bit and are programmed using a second programming voltage that is higher than the first programming voltage.

9. The system of claim 8, wherein the operations further comprise:
maintaining a first cursor configured to indicate memory cells that are available to store data programmed to the first memory pages at the one or more memory devices and a second cursor configured to indicate memory cells that are available to store data programmed to the second memory pages at the one or more memory devices, wherein the first cursor indicates the second set of memory cells and the second cursor indicates the third set of memory cells.

10. The system of claim 9, wherein at least one of the first cursor or the second cursor is a garbage collection cursor.

11. The system of claim 8, wherein a first sequence at which at least one of the first set of host data items or the second set of host data items are programmed to the one or more memory devices does not correspond to the target sequence, and wherein a second sequence at which at least one of the valid host data items of the first set of host data items are copied to the second set of memory cells or the valid host data items of the second set of host data items are copied to the third set of memory cells corresponds to the target sequence.

12. The system of claim 8, wherein the first memory pages correspond to a first memory page level associated with the first set of memory cells and the second memory pages correspond to one or more second memory pages levels associated with the first set of memory cells.

13. The system of claim 12, wherein the second memory pages correspond to at least one of upper memory pages or extra memory pages associated with the first set of memory cells.

14. The system of claim 8, wherein the first set of memory cells, the second set of memory cells, and the third set of memory cells each include at least one of a multi-level memory cell, a triple-level memory cell, or a quad-level memory cell.

15. A non-transitory computer-readable storage medium comprising instructions that, when executed by a processing device, cause the processing device to perform operations comprising:
programming a first set of host data items to first memory pages residing at a first region of a memory sub-system;
programming a second set of host data items to second memory pages residing at the first region;
determining that a first sequence at which the first set of host data items and the second set of host data items are programmed does not correspond to a target sequence associated with the memory sub-system, wherein the target sequence is based on a numerical order of logical memory addresses of the first and second sets of host data items;
copying one or more of the first set of host data items from one or more first memory pages to a second region of the memory sub-system allocated to store host data items that were initially programmed to first memory pages at the memory sub-system, wherein the second region is configured for lower memory pages, wherein the lower memory pages utilize a lower bit and are programmed using a first programming voltage; and
copying one or more of the second set of host data items from one or more second memory pages to a third region of the memory sub-system allocated to store host data items that are programmed to second pages at the memory sub-system, wherein the third region is configured for higher memory pages, wherein the higher memory pages utilize an upper bit or an extra bit and are programmed using a second programming voltage that is higher than the first programming voltage, and wherein a second sequence of the copied one or more of the first set of host data items at the second region and the copied one or more of the second set of host data items at the third region correspond to the target sequence.

16. The non-transitory computer-readable storage medium of claim 15, wherein the target sequence minimizes data fragmentation of host data across one or more memory devices of the memory sub-system.

17. The non-transitory computer-readable storage medium of claim 15, wherein at least one of the one or more of the first set of host data items or the one or more of the second set of host data items are copied from the first region responsive to detecting an idle time period associated with incoming host data traffic.

18. The non-transitory computer-readable storage medium of claim 15, wherein the first region of the memory sub-system and the second region of the memory sub-system correspond to regions associated with storing data items that are subject to a media management operation.

19. The non-transitory computer-readable storage medium of claim 15, wherein the first memory pages correspond to a first memory page level of a first set of memory cells residing at the first region and the second memory pages correspond to one or more second memory page levels of the first set of memory cells.

20. The non-transitory computer-readable storage medium of claim 19, wherein the second memory pages correspond to at least one of upper memory pages or extra memory pages residing at the first region.

\* \* \* \* \*